May 22, 1923.

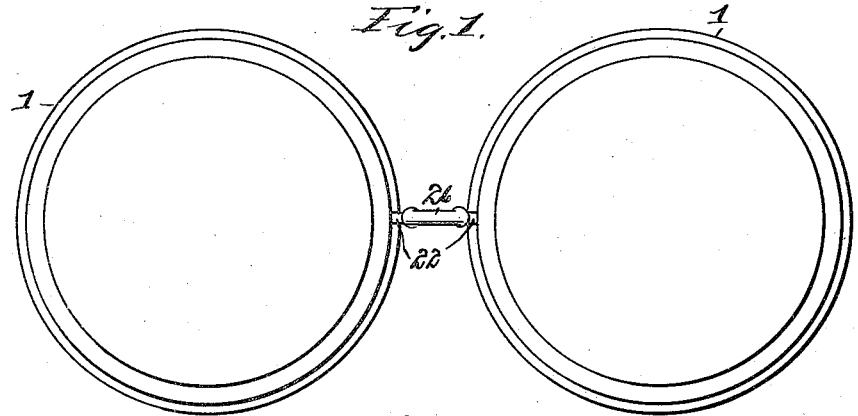
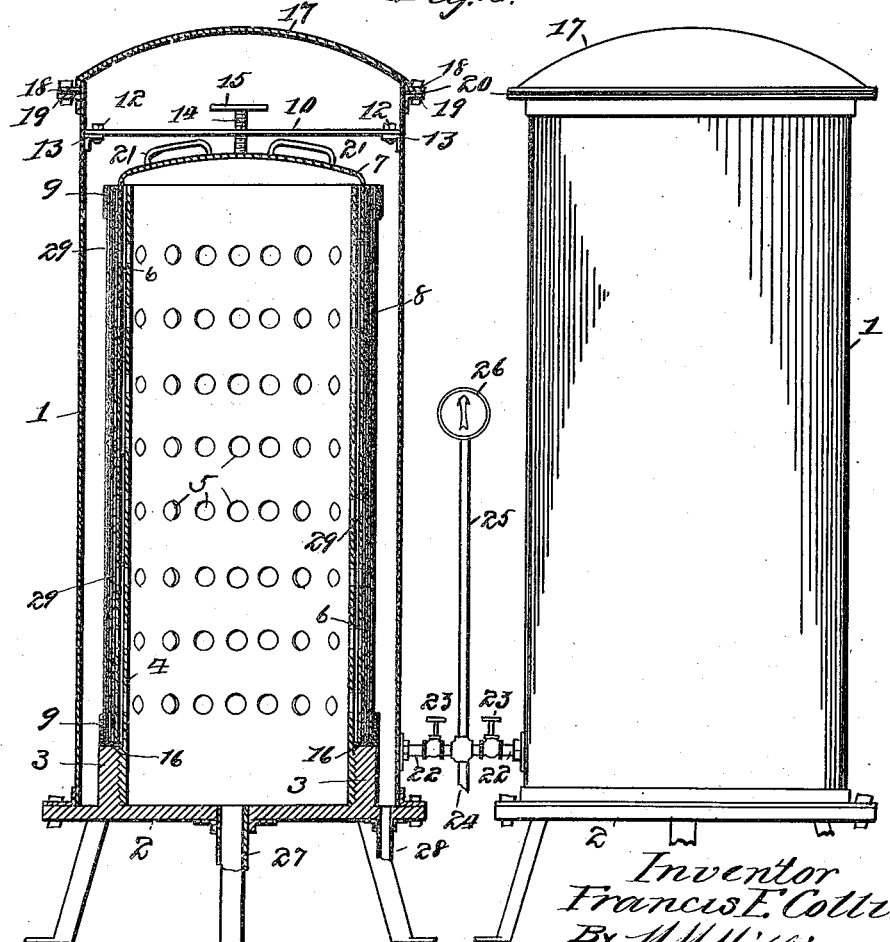

F. E. COLLINS

PRESSURE OIL FILTER

Filed May 3, 1920

Inventor
Francis E. Collins
By Williamson
Atty.

Patented May 22, 1923.

1,456,095

UNITED STATES PATENT OFFICE.

FRANCIS E. COLLINS, OF CONSHOHOCKEN, PENNSYLVANIA.

PRESSURE OIL FILTER.

Application filed May 3, 1920. Serial No. 378,450.

*To all whom it may concern:*

Be it known that I, FRANCIS E. COLLINS, a citizen of the United States, residing at Conshohocken, in the county of Montgomery and State of Pennsylvania, have invented new and useful Improvements in Pressure Oil Filters, of which the following is a specification.

My invention relates to a new and useful improvement in pressure oil filters, and has for its object to provide an exceedingly simple and effective device of this description to which oil may be pumped or otherwise fed to an exterior compartment from whence it will be filtered to an interior compartment and thereafter drawn off for use or storage.

A further object of my invention is to provide a simple and effective filtering element which may be readily removed from the tank for cleaning or renewal, and A still further object of my invention is to provide for the arrangement of the filtering tanks in pairs and the supplying of oil to either one or the other of said tanks so that a continuous process of filtering may be carried on.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a plan view of a pair of filters made in accordance with my improvement.

Fig. 2, is an elevation of Fig. 1, one of the tanks being in section.

Figure 5:
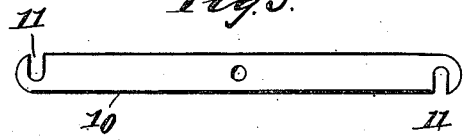
Fig. 5, is a detail view of the lock bar for holding the filtering element in place.
Figure 3:
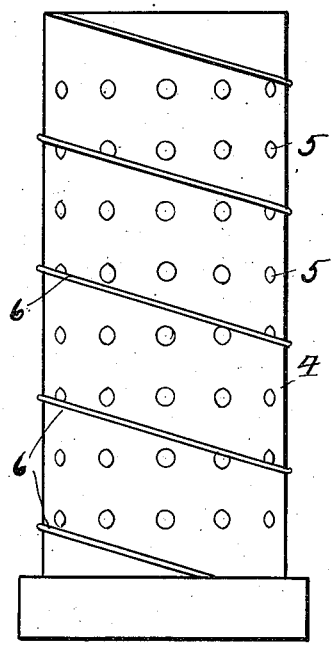
Fig. 3, is an elevation of the filtering element with the filtering cloth removed.
Figure 4:
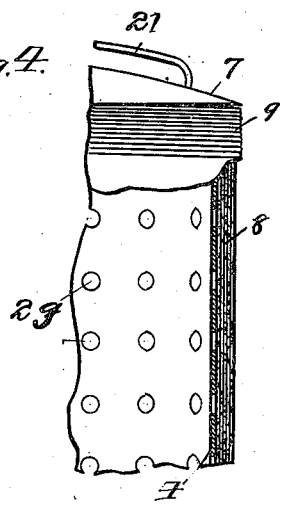
Fig. 4, is a section of a portion of the filtering element showing the filtering cloth applied thereto.

In carrying out my invention as here embodied, 1 represents the casing or tank of the filter having a suitable base 2 to which it is secured, and this base is provided with a cylindrical hub 3 into which the lower end of the tube 4 is threaded, said tube having a series of perforations 5 formed therein.

6 represents a spiral rib extending around the outer circumference of the tube 4, and this rib may be formed by coiling a wire around the tube or in any other suitable manner.

7 represents the filtering element which is composed of a casing having its upper end closed and adapted to slide over the tube 4 and be spaced from the latter by the spiral ribs 6, and upon the outer surface of this casing is secured a filtering material 8 such as cloth by means of the wound cords or wires 9.

10 represents a locking bar having its ends slotted as indicated at 11 in order that they may pass under the heads of the bolts 12 which are threaded into the brackets 13 secured upon the inside of the casing 1. Through this locking bar is threaded the clamp screw 14 having a hand wheel 15 for forcing it downward upon the closed end of the filtering member 7 thus forcing the lower end of said filtering member against the packing washer 16 thereby making an oil tight joint between the filtering member and the cylindrical hub 3.

17 represents the cover of the filter having a flange 18 for securement to the flange 19 carried by the upper end of the casing, a suitable packing washer 20 being interposed between these flanges for making an oil tight joint. By this arrangement the filtering member may be readily removed from the casing by first removing the cover 17 backing off the clamp screw 14 disengaging the ends of the locking bar 10 from the bolts 12 and lifting the filtering member by the handles 21.

In practice I have utilized a pair of these filters coupling the same together by the pipes 22 in which are located stop cocks 23 and to which is connected a pipe line 24; from between these cocks also extends a gage pipe 25 upward carrying a pressure gage 26 upon its upper end.

27 represents a pipe leading from the interior of the filtering element to convey the filtered oil to a storage tank or other desired point, while 28 represents a drain pipe communicating with the space between the filtering element and the outer walls of the casing so as to drain this space when desired.

From the foregoing description the operation of my improved filter will be obviously as follows:—

The oil to be filtered is pumped through the pipe 24 into the space between the filtering element and the outer walls of the casing of either of the pair of filters by the proper manipulation of the stop cocks 23, and the oil thus filling this space will gradually seep through the filtering cloth and pass through the perforations 29 in the filtering element to the space formed by the spiral ribs 6 and from thence through the perforations 5 into the interior of the stationary tube 4 where it will accumulate and may be drawn therefrom for storage or use.

When one of the filters has been filled the stop cocks 23 are so manipulated as to shut off the supply of oil from this filter and permit it to flow into the other filter of the pair, or the supply may be continuous to both filters the pressure on the oil being indicated by the gage 26.

When it is necessary to clean the filtering element of either of the filters the stop cock 23 through which oil is supplied to that particular filter is shut off and the filtering element may be removed to be cleansed and replaced as before described.

By providing the stationary tube 4 and spacing the filtering element therefrom by the spiral ribs and securing the filtering cloth upon the filtering element a great advantage is gained in the filtering process since the oil under pressure may readily seep through the filtering cloth and gain access to the interior of the stationary tube without the tendency of clogging, and as the filtering cloth may be readily removed from the filtering element for cleaning or replacement the apparatus may be easily kept in a state of high efficiency.

Of course I do not wish to be limited to the exact details of construction as herein shown as these may be varied within the limits of the appended claims without departing from the spirit of my invention.

Having thus fully described my invention, what I claim as new and useful is:—

1. In a filter of the character described, a casing, a base, a circular hub formed with said base and projecting into the casing, a tube having its lower end threaded into said hub, said tube being perforated, ribs arranged in spiral form around the exterior of the tube, a filtering member adapted to fit over said ribs and be thereby spaced from the tube, a removable clamping bar located within the casing, a clamp screw threaded through said bar and bearing upon the top of the filtering member, and a cover adapted to be secured oil tight upon the casing.

2. An oil filter comprising in combination, a casing, an upright perforated tube in said casing, ribs arranged in spiral form around the exterior of said tube, a filtering element consisting of a perforated casing having an open end and a closed end, and a filtering material surrounding the perforated casing and secured thereto at its ends, said filtering element telescoping over the upright tube and spaced therefrom in concentric relation by the spiral ribs, and means for clamping the filtering element in position.

In testimony whereof, I have hereunto affixed my signature.

FRANCIS E. COLLINS.